(12) United States Patent
Cheng et al.

(10) Patent No.: US 6,861,897 B1
(45) Date of Patent: Mar. 1, 2005

(54) ACTIVE FILTER FOR MULTI-PHASE AC POWER SYSTEM

(75) Inventors: Louis Cheng, Scarborough (CA); Qihua Zhao, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/640,091

(22) Filed: Aug. 13, 2003

(51) Int. Cl.[7] .................................................. H03B 1/00
(52) U.S. Cl. ...................................................... 327/552
(58) Field of Search ................................ 327/551, 552, 327/553, 555, 556, 557, 558, 559

(56) References Cited

U.S. PATENT DOCUMENTS

| | | | |
|---|---|---|---|
| 4,439,823 A | 3/1984 | Gyugyi et al. | |
| 4,600,872 A | 7/1986 | Shepard, Jr. | |
| 4,625,160 A | 11/1986 | Hucker | |
| 4,949,021 A | 8/1990 | Rozman et al. | |
| 4,967,097 A | 10/1990 | Mehl | |
| 5,068,590 A | 11/1991 | Glennon et al. | |
| 5,309,081 A | 5/1994 | Shah et al. | |
| 5,391,975 A | 2/1995 | Okubo | |
| 5,495,163 A | 2/1996 | Rozman et al. | |
| 5,668,457 A | 9/1997 | Motamed | |
| 5,677,832 A * | 10/1997 | Tissier et al. | 363/41 |
| 6,075,350 A * | 6/2000 | Peng | 323/207 |
| 6,166,928 A | 12/2000 | Chandorkar | |
| 6,545,887 B2 * | 4/2003 | Smedley et al. | 363/89 |

* cited by examiner

Primary Examiner—Jeffrey Zweizig
(74) Attorney, Agent, or Firm—Larry J. Palguta

(57) ABSTRACT

An active filter (300) generates multi-phase compensating current in an AC power supply system (10) that supplies a load (200). The filter (300) includes a compensating current output device (34) outputting multi-phase compensating current to an AC power line (50); and a controller (310) for controlling the compensating current output (340) such that the multi-phase compensating current compensates for current harmonics and power factor on said AC power line (50). The controller (310) estimates current harmonics and power factor compensating values as a function of multi-phase power measurements.

34 Claims, 8 Drawing Sheets

ACTIVE FILTER FOR MULTI-PHASE AC POWER SYSTEM

BACKGROUND OF THE INVENTION

1. Field of the Invention

This invention relates to power factor and current harmonics compensation in a multi-phase AC power system.

2. Related Art

Electrical power distributions systems that deliver AC power are known to be affected by characteristics of the associated load(s). More specifically, non-linear loads, such as motor drives, generate substantial current harmonics in the power supply lines. Furthermore, such loads may cause power factor displacement and imbalance between phases of the current and voltage supplied in the power system. It has been recognized that mitigating the effects of load-generated harmonics can improve the performance of the power system. To this end, one conventional technique for improving quality of the supplied multi-phase power has been to install passive filters inside the loads to suppress the current harmonics being generated by the loads themselves.

Although the use of passive filters can effectively remove some of the major harmonics, such filters are source impedance dependant. Also, this technique does not address other power quality issues caused by the load(s). More specifically, the use of passive filters does not compensate for power factor displacement or maintain balance between phases of the supply voltage and supply current. Thus, conventional techniques offer only an incomplete solution for power quality in a multi-phase AC power system.

SUMMARY OF THE INVENTION

In one aspect, the present invention provides an active filter that suppresses current harmonics and improves power factor in a variable or constant frequency multi-phase power system. In another aspect, the present invention provides a controller of an active filter that generates a multi-phase compensating current that compensates the power factor and current harmonics in a variable or constant frequency multi-phase power system.

In one embodiment, the present invention is an active filter for generating multi-phase compensating current in an AC power supply system that supplies a load, the active filter comprising: a compensating current output device outputting multi-phase compensating current to an AC power line; and a controller for controlling the compensating current output such that the multi-phase compensating current compensates for current harmonics and power factor on the AC power line. The controller estimates current harmonics and power factor compensating values as a function of multi-phase supply measurements.

In another embodiment, the present invention is a controller of an active filter that generates multi-phase compensating current in an AC power supply system that supplies a load, the controller comprising: an input for receiving multi-phase power supply measurements; a compensating current calculation unit for calculating multi-phase compensating current based on the multi-phase power supply measurements; and an output for outputting control signals based on the calculated multi-phase compensating current to control a compensating current output device to compensate for current harmonics and power factor on an AC power line.

BRIEF DESCRIPTION OF THE DRAWINGS

Other aspects and advantages of the present invention will become apparent upon reading the following detailed description and upon reference to the drawings, in which.

DETAILED DESCRIPTION

Figure 1:
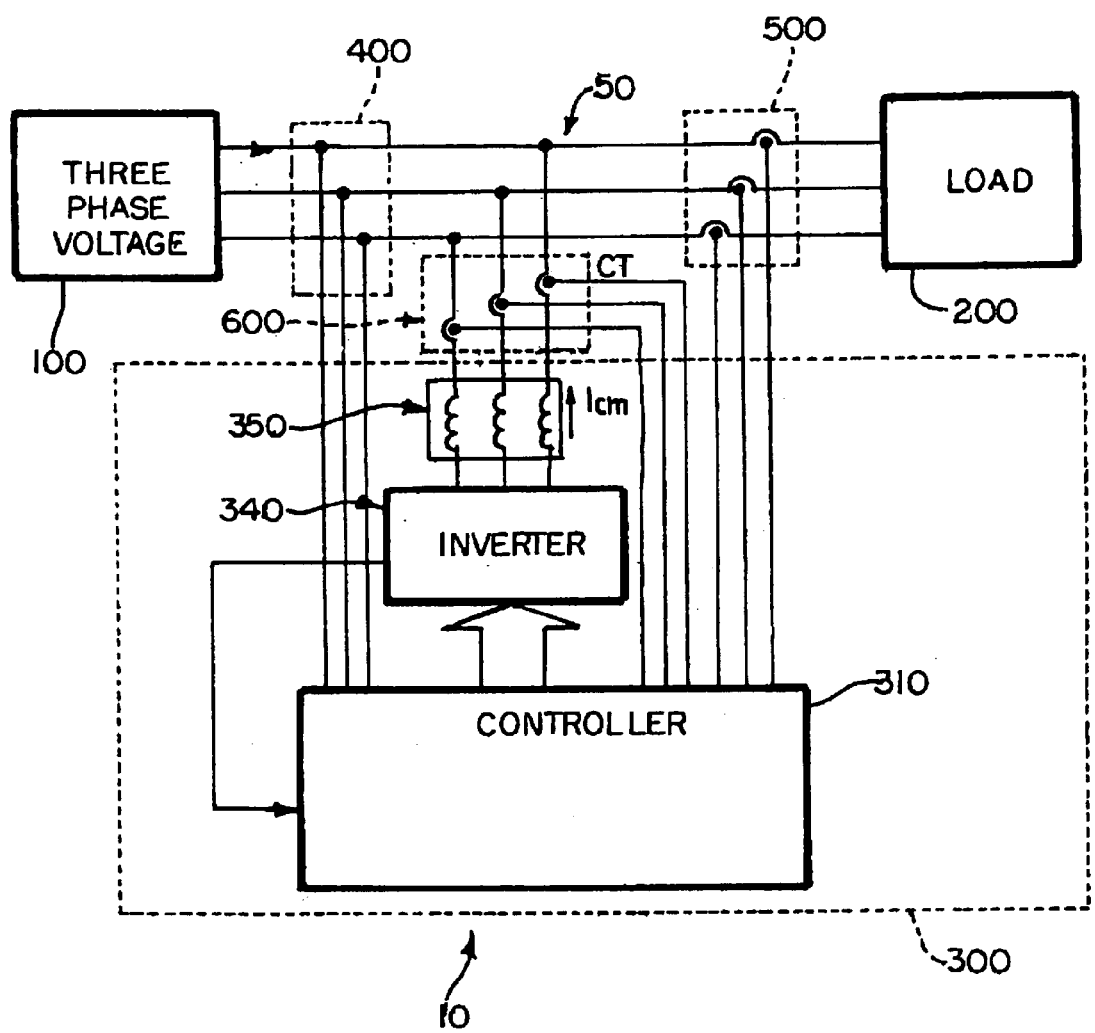
FIG. 1 illustrates an exemplary implementation of an active filter that compensates for power factor and current harmonics in a multi-phase AC power system in accordance with the principles of the present invention.

FIG. 1 illustrates a multi-phase AC power system implementing an active filter for compensating power factor and current harmonics in accordance with the principles of the present invention. As shown in FIG. 1, the power system 10 includes: a three-phase voltage source 100 that supplies constant or variable frequency power via power lines 50; a load 200 that draws three-phase current from the power lines 50; a voltage measuring unit 400 for sampling the three-phase voltage supplied by the three-phase voltage source 100 via the power lines 50; a load current measuring unit 500 for sampling the three-phase current being supplied to the load 200 via the power lines 50; an active filter 300 for outputting a three-phase compensating current to the power lines 50 to compensate for power factor and harmonics; and a compensating current measuring unit 600 for measuring the compensating current output by the active filter 300. The load 200 may be a non-linear load (e.g., motor drives), which creates current harmonics in the AC power system 10 and creates power factor displacement and phase imbalance. It should be recognized, however, that applicability of the active filter 300 is not limited to such load types.

As shown in FIG. 1, the active filter 300 includes a controller 310; an inverter 340; and an inductor-based filtering unit 350. In accordance with switching control signals output by the controller 310, the inverter 340, which is a voltage-source inverter, generates a multi-phase compensating current that is injected to the power lines 50 via the filtering unit 350. An Insulated Gate Bipolar Transistor (IGBT) voltage-source inverter is a well-known device, and, as such, details of the inverter configuration/operation are not provided herein.

In a manner described in detail below, the controller 310 of the active filter 300 receives multi-phase voltage measurements from the voltage measuring unit 400 and multi-phase current measurement values from the current measuring unit 500 and calculates a compensating current for compensating for current harmonics, power factor displacement, and phase imbalance power conditions. As a result of this calculation, the controller 310 outputs gating control signals to the inverter 340, generating the multi-phase compensating current output to the power lines 50. Thus, based on the computations performed by the controller 310, the active filter 300 injects counter current harmonics into the power system 10, as well as compensates for power factor displacement and phase imbalance. The power system 10 illustrated in FIG. 1 may be a variable frequency system or a constant frequency system, such as an aircraft 400 Hz system.

Figure 2:
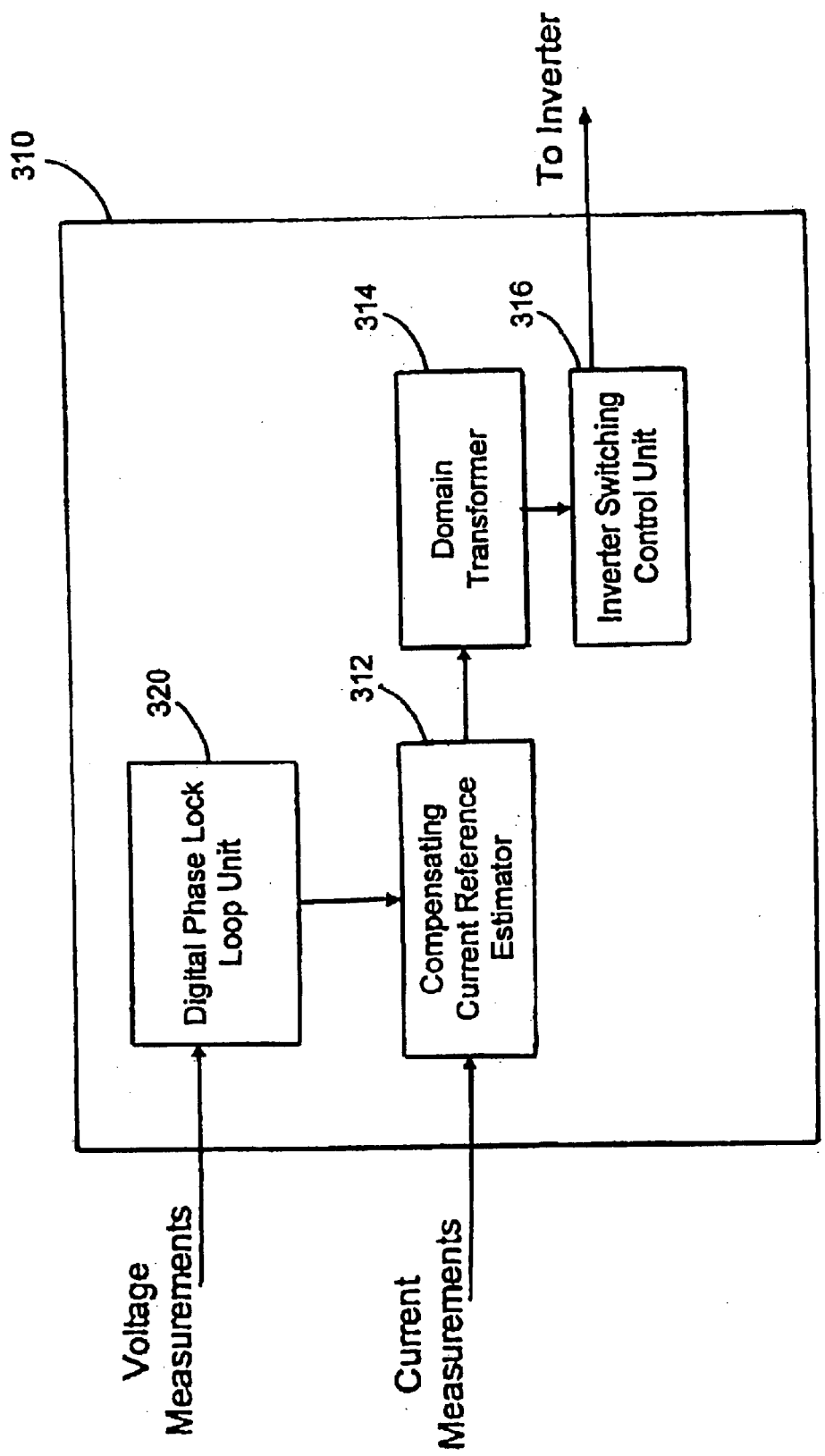
FIG. 2 illustrates an active filter controller configuration for controlling the generation of multi-phase compensating current in accordance with an embodiment of the present invention.
Figure 3:
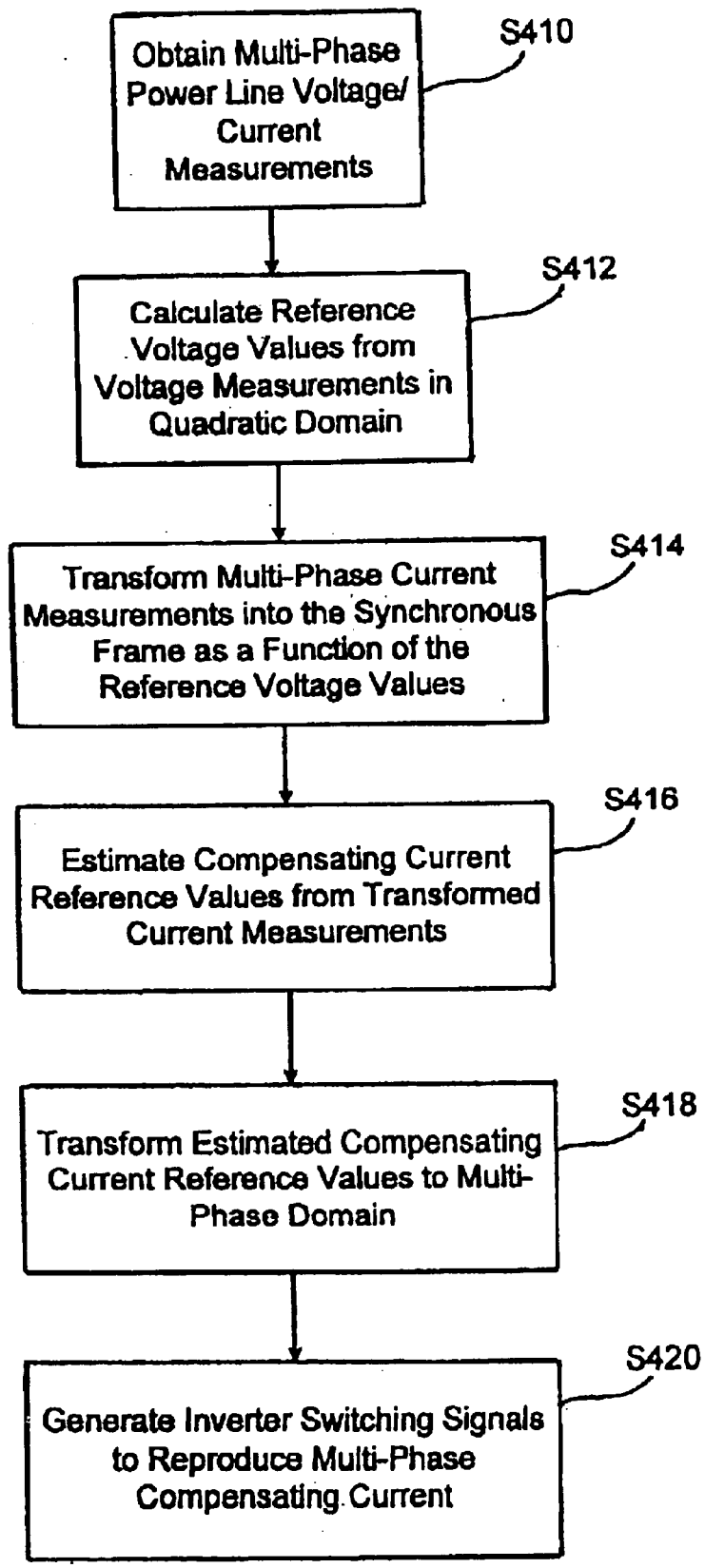
FIG. 3 is a flow diagram illustrating an operation performed by the active filter controller to control the multi-phase compensating current generated to compensate for power factor and current harmonics in accordance with an embodiment of the present invention.

FIG. 2 is a block diagram illustrating a configuration of the controller 310 according to an embodiment of the present invention. As shown in FIG. 2, the controller 310 includes: a digital phase lock loop unit 320; a compensating current reference estimator 312; a domain transformer 314; and an inverter switching control unit 316. Operation of and functional interaction between the components illustrated in FIG. 2 will become apparent from the following discussion. Initially, although the various components of FIG. 2 are illustrated as discrete elements, such an illustration is for ease of explanation and it should be recognized that certain operations of the various components may be performed by the same physical device, e.g., one or more digital controllers. General operation of the controller 310 illustrated in FIG. 2 will be described with reference to the flow diagram of FIG. 3.

Initially, the controller 310 receives multi-phase voltage measurements from the voltage measuring unit 400 and multi-phase current measurements from the current measuring unit 500 (S410). The voltage measurements are supplied to the digital phase lock loop unit 320. In a manner discussed in more detail below, the digital phase lock loop unit 320 calculates reference voltage values from the multi-phase voltage measurements in the quadratic (d-q) reference frame domain (S412). The compensating current reference estimator 312 receives the multi-phase current measurement values and the reference voltage values calculated by the digital phase lock loop unit 320 and estimates compensating current reference values (S416). The compensating current reference estimator 312 outputs compensating current reference values (Icd, Icq, IcO) in the d-q axis domain, which are transformed by the domain transformer 314 into the multi-phase abc domain (Ica, Icb, Icc) (S418). The inverter switching control unit 316 compares values Ica, Icb, Icc to a reference (e.g., triangular) waveform to generate switching control values for the inverter 340 (S420). These operations will be explained in greater detail below.

Figure 4:
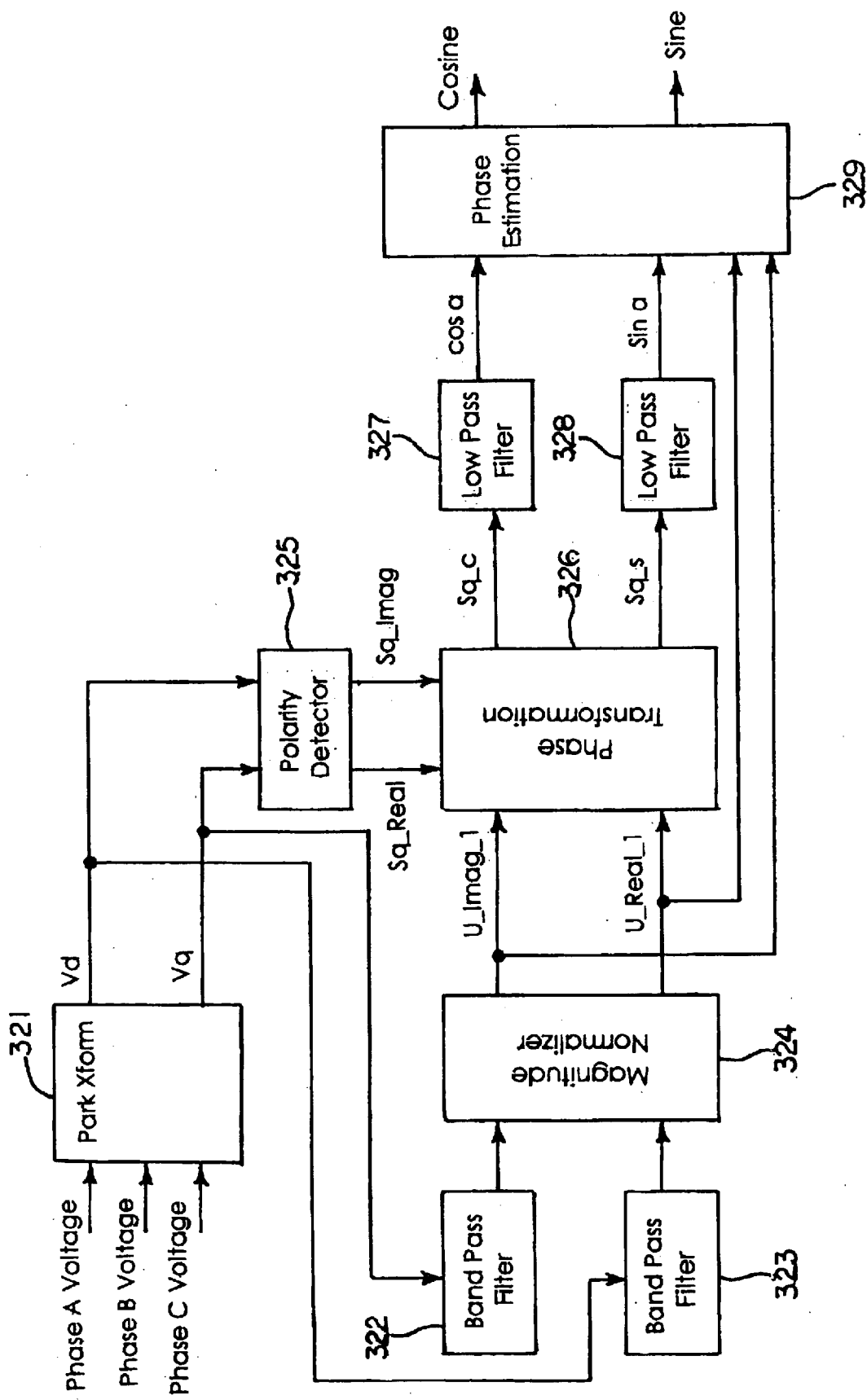
FIG. 4 is a block diagram illustrating components of a digital phase lock loop unit that generates voltage reference values used to calculate current compensating values in accordance with an embodiment of the present invention.

FIG. 4 is a block diagram illustrating components of the digital phase lock loop (DPLL) unit 320 of the controller 310 in accordance with one embodiment of the present invention. Again, the functional elements are illustrated as a plurality of discrete elements, but it should be recognized that these functions may be combined in one or more processing elements. As shown in FIG. 4, the DPPL unit 320 includes a park transformation unit 321; band pass filters 322, 323; a magnitude normalizer 324; a polarity detector 325; a phase transformation unit 326; low pass filters 327, 328; and a phase estimation unit 329. Operation and functional interaction between these elements will next be described.

The DPLL unit 320 computes the voltage reference signals Cosine, Sine, which are subsequently used to estimate the multi-phase compensating current. First, the park transformer unit 321 transforms the three-phase power line voltages into the quadratic (d-q) reference frame. The transformation performed by the park transformation unit 321 is defined as below:

$$\begin{bmatrix} Vd \\ Vq \end{bmatrix} = \frac{2}{3} \begin{bmatrix} 1 & -\frac{1}{2} & -\frac{1}{2} \\ 0 & -\frac{\sqrt{3}}{2} & \frac{\sqrt{3}}{2} \end{bmatrix} \begin{bmatrix} Va \\ Vb \\ Vc \end{bmatrix} \quad \text{(equation 1)}$$

where:

Va, Vb, Vc=Phase voltages;

Vd=Transformed voltage in d-axis; and

Vq=Transformed voltage in q-axis.

Second, d-q axis voltage outputs, Vd and Vq, are filtered by band pass filters 322, 323, respectively, to extract the fundamental components therefrom. The band pass filter outputs are normalized by the magnitude normalizer unit 324 by scaling these values to unity magnitude to generate signals U_Imag_1 and U_Real_1. The magnitude normalizer 324, connected to the outputs of band pass filters 322, 323, scales the voltage signals (Vd, Vq) to unity magnitude (U_Real_1 and U_Imag_1) by using the following equation:

$$\begin{bmatrix} U\_Real\_1 \\ U\_Imag\_1 \end{bmatrix} = \frac{1}{\sqrt{Vd^2 + Vq^2}} \begin{bmatrix} Vd \\ Vq \end{bmatrix} \quad \text{(equation 2)}$$

The polarity detector 325 generates a square wave in accordance with the voltage signals (Vd, Vq) output by the park transformation unit 321.

This operation is defined as below:

If $Vd \geq 0$ then Sq_Real=1 Else Sq_Real=0

If $Vq \geq 0$ then Sq_Imag=1 Else Sq_Imag=0. \quad (equation 3)

Next, the phase transformation unit 326 multiples U_Imag_1 and U_Real_1 by un-filtered d-q voltage signals, Sq_Real and Sq_Imag (output by the polarity detector 325), to form the modulated product signals, sqc and sqs. By multiplying the unity voltage signals (U_Real_1, U_Imag_1) with the square wave references (Sq_Real, Sq_Imag), the phase transformation unit 326 produces phase shifting signals (sqs, sqc) of the two signals. The equation for this operation is:

$$\begin{bmatrix} sqs \\ sqc \end{bmatrix} = \begin{bmatrix} -Sq\_Imag & Sq\_Real \\ Sq\_Real & Sq\_Imag \end{bmatrix} \begin{bmatrix} U\_Real\_1 \\ U\_Imag\_1 \end{bmatrix} \quad \text{(equation 4)}$$

These products contain DC and AC components. The DC components correspond to the phase shift of the filtered references, and the AC components represent the harmonics contents in the power line 50.

The low pass filters 327, 328 receive the outputs of the phase transformation unit 326, sqc and sqs, respectively. The low pass filters 327, 328 filter out the DC component of the phase shifting signals (sqs, sqc), outputting signals cos α and sin α, respectively. The DC components represent the phase shift of the voltage references (U_Real_1, U_Imag_1) with respect to the transformed voltages (Vd, Vq). The phase estimation unit 329 shifts the voltage references (U_Real_1, U_Imag_1) to generate the reference signals (Sine, Cosine):

$$\begin{bmatrix} Sine \\ Cosine \end{bmatrix} = \begin{bmatrix} \cos\alpha & \sin\alpha \\ \sin\alpha & -\cos\alpha \end{bmatrix} \begin{bmatrix} U\_Real\_1 \\ U\_Imag\_1 \end{bmatrix} \quad \text{(equation 5)}$$

The reference signals (Sine, Cosine) will be used in transforming the measured voltage and current into the synchronous frame as discussed below. As described above, the band pass filters 322, 323 extract the fundamental voltage components in the d-q axis. However, this filtering causes phase shifting to the function. The polarity detector 325, the phase transformation unit 326, and the low pass filters 327, 328 compute the phase shifting. Based on the estimated phase shift, the phase estimation unit 329 corrects the voltage references by adjusting its phase in accordance with equation 5.

The measured current is transformed into the synchronous frame with respect to the voltage references signals Sine, Cosine output by the DPPL 320. The reference signals are computed from the measured voltages as described above. In accordance with these reference signals (Sine, Cosine), the compensating current reference estimator 312 transforms the measured currents are transformed with the equation defined as below:

$$\begin{bmatrix} Id \\ Iq \\ I0 \end{bmatrix} = \frac{2}{3} \begin{bmatrix} Sine & -\frac{1}{2}Sine + \frac{\sqrt{3}}{2}Cosine & -\frac{1}{2}Sine + -\frac{\sqrt{3}}{2}Cosine \\ Cosine & -\frac{1}{2}Cosine - \frac{\sqrt{3}}{2}Sine & -\frac{1}{2}Cosine + \frac{\sqrt{3}}{2}Sine \\ 1 & 1 & 1 \end{bmatrix} \begin{bmatrix} Ia \\ Ib \\ Ic \end{bmatrix} \quad \text{(equat. 6)}$$

The transformed current signals (Id, Iq, I0) consist of DC and AC components. The DC component corresponds to the fundamental current component and the AC component corresponds to the current harmonics. The power factor displacement constitutes the reactive current in the q-axis, and it is corresponded to the imaginary current Iq. Table 1 below shows the variations of transformed current component combinations that are used to estimate the compensating current reference.

| Item | Description | Constituents | Compensating Current |
|---|---|---|---|
| 1 | Current Harmonics | AC Components of the transformed currents (Id, Iq) | Icd = −Id(ac)<br>Icq = −Iq(ac)<br>Ic0 = 0 |
| 2 | Power Factor | Current in q-axis Iq | Icd = 0<br>Icq = −Iq<br>Ic0 = 0 |
| 3 | Balance of three-phase current | Zero Sequence current I0 | Icd = 0<br>Icq = 0<br>Ic0 = −I0 |
| 4 | Current Harmonics and Power Factor | AC Components of the transformed current Id + current in q-axis Iq | Icd = −Id(ac)<br>Icq = −Iq<br>Ic0 = −I0 |
| 5 | Current Harmonics, Power Factor and Balancing three-phase current | AC Components of the transformed current Id + current in q-axis Iq + Zero Sequence current I0 | Icd = −Id(ac)<br>Icq = −Iq<br>Ic0 = −I0 |
| 6 | Power Factor and balance of three-phase current | Current in q-axis Iq + Zero Sequence current I0 | Icd = 0<br>Icq = −Iq<br>Ic0 = −I0 |
| 7 | Current Harmonics and Balancing three phase current | AC Components of the transformed current Id + Zero Sequence current I0 | Icd = −Id(ac)<br>Icq = −Iq(ac)<br>Ic0 = −I0 |

In accordance with Table 1, the transformed current constituents represent the power quality of three-phase power system 10. Thus, the compensating current reference estimator 312 uses Id, Iq, and I0 (the table defines the combinations in the above equations to improve the power quality) to calculate compensating values, Icd, Icq, and Ic0 in the d-q axis. The domain transformation unit 314 inversely transforms the compensating current (Icd, Icq, Ic0) in d-q-axis into abc domain (Ica, Icb, Icc) and the inverter switching control unit 316 compares the resulting values to a triangle waveform to generate the switching control signals to the inverter. The following is the equation of the inverse transformation:

$$\begin{bmatrix} Ica \\ Icb \\ Icc \end{bmatrix} = \begin{bmatrix} Sine & Cosine & \frac{1}{2} \\ -\frac{1}{2}Sine + \frac{\sqrt{3}}{2}Cosine & -\frac{1}{2}Cosine - \frac{\sqrt{3}}{2}Sine & \frac{1}{2} \\ -\frac{1}{2}Sine - \frac{\sqrt{3}}{2}Cosine & -\frac{1}{2}Cosine + \frac{\sqrt{3}}{2}Sine & \frac{1}{2} \end{bmatrix} \begin{bmatrix} Icd \\ Icq \\ Ic0 \end{bmatrix} \quad \text{(equation 7)}$$

According to the present invention, the active filter 300 uses the characteristics of the transformed current to extract the power quality information and to inject a compensating current into the system 10. The controller 310 further receives a measure of the compensating current from the compensating current measuring unit 600 to adjust the switching control signals output to the inverter 340.

Figure 5:
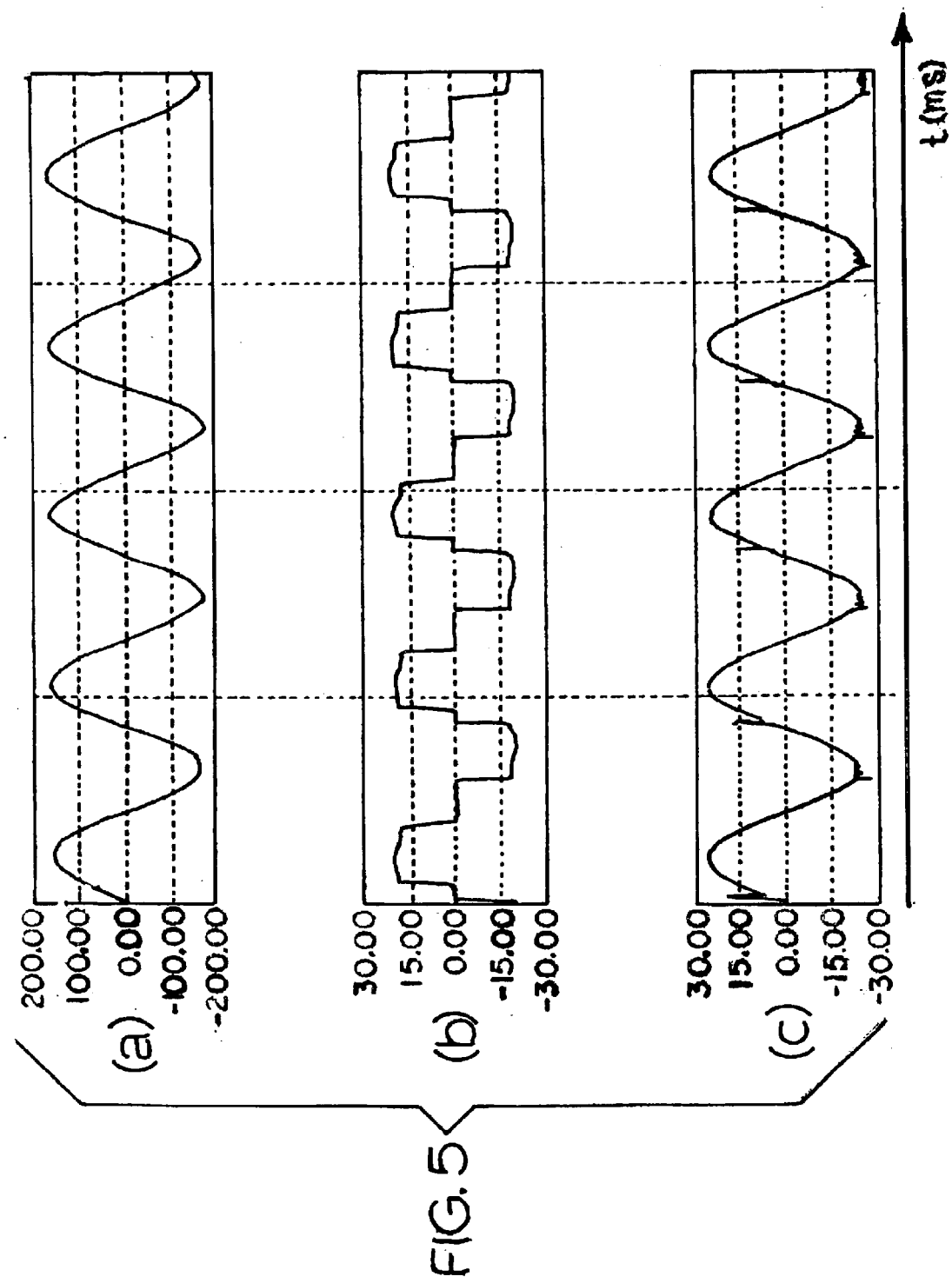
FIG. 5 illustrates a series of waveforms to demonstrate the operating principles of the active filter in accordance with an embodiment of the present invention.
Figure 6A:
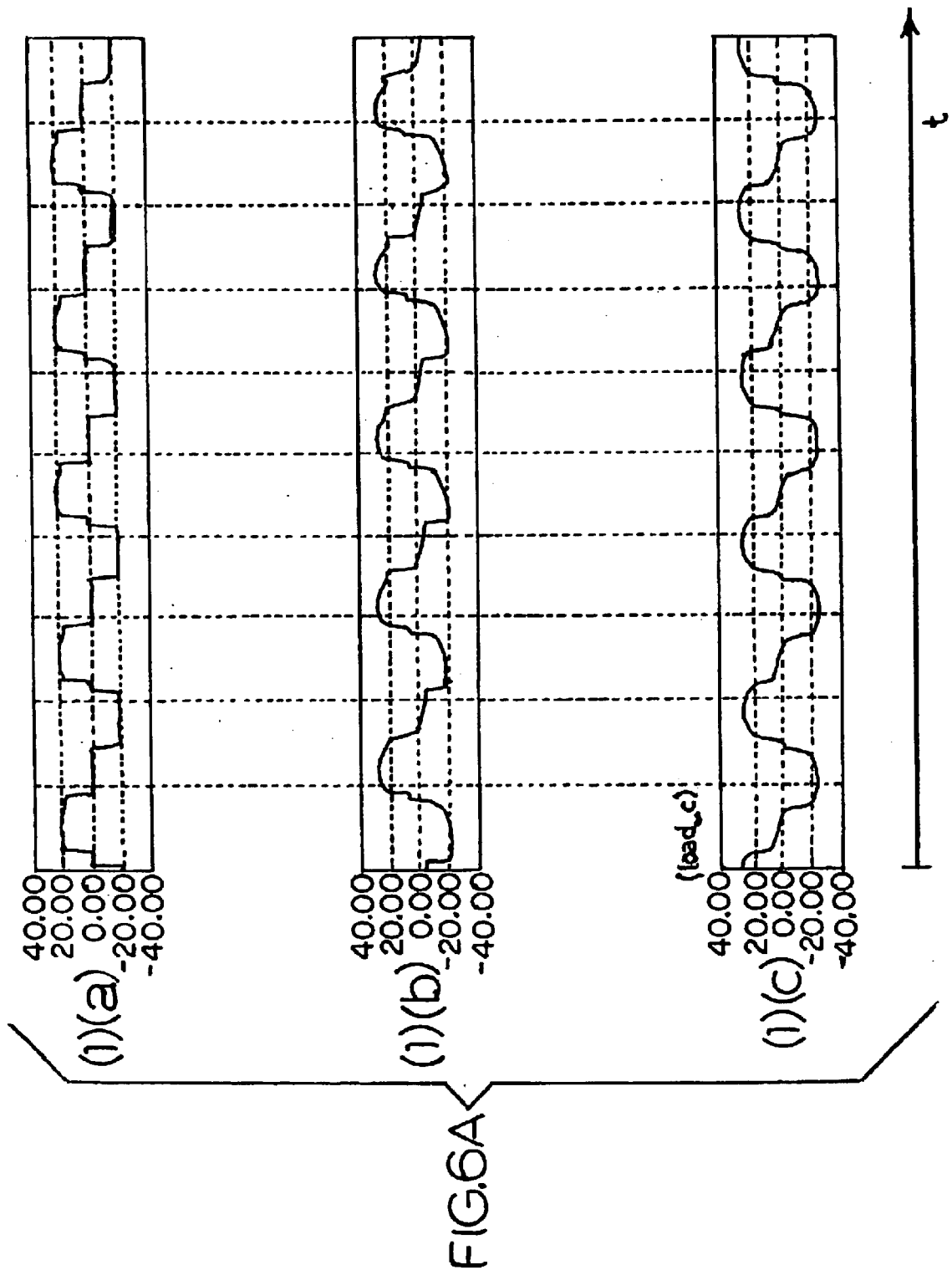
FIGS. 6A–6C illustrate a series of waveforms that further demonstrate the operating principles of the active filter for compensating power factor and current harmonics in a multi-phase power system in accordance with the principles of the present invention.
Figure 6B:
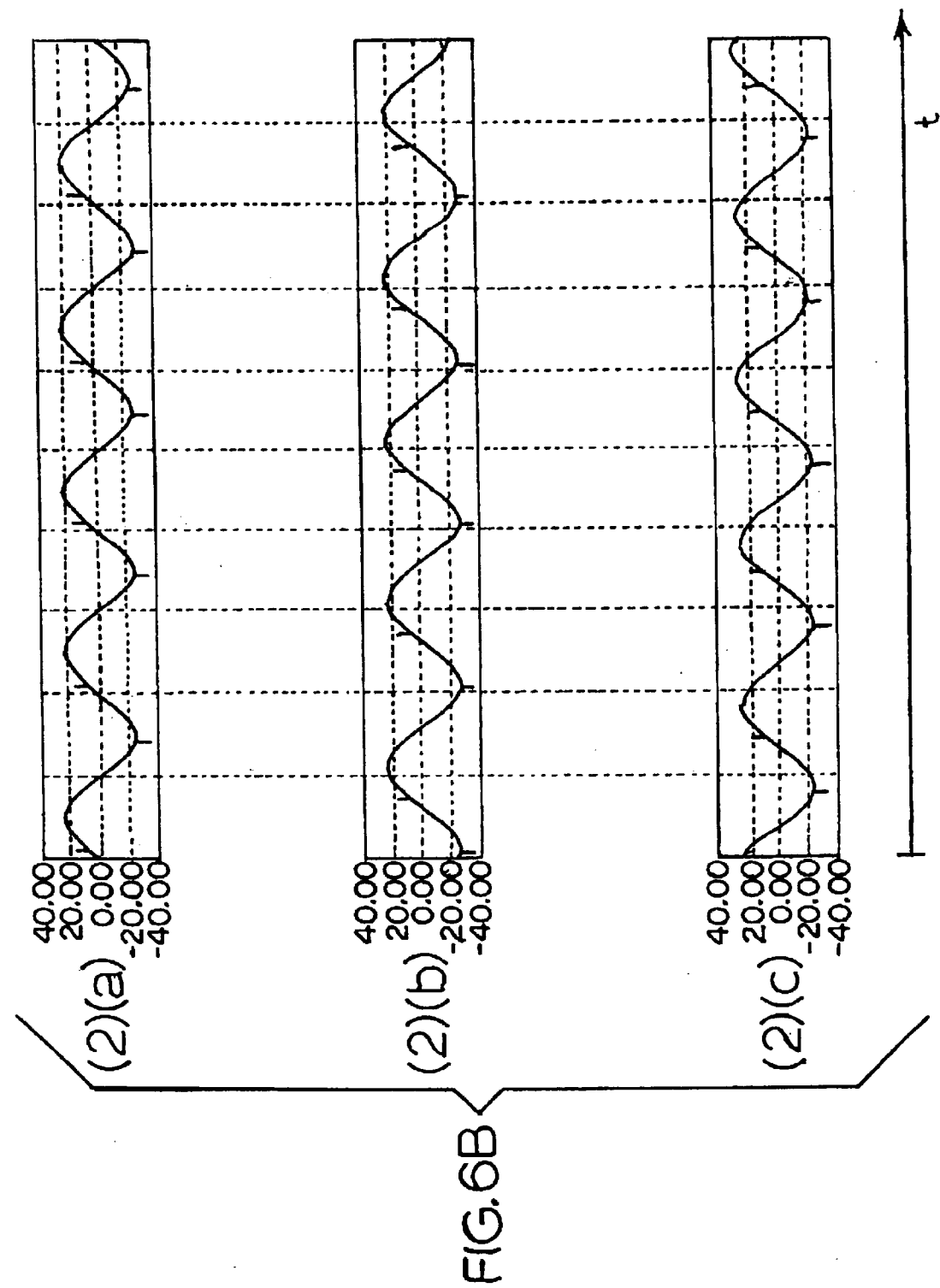
Figure 6C:
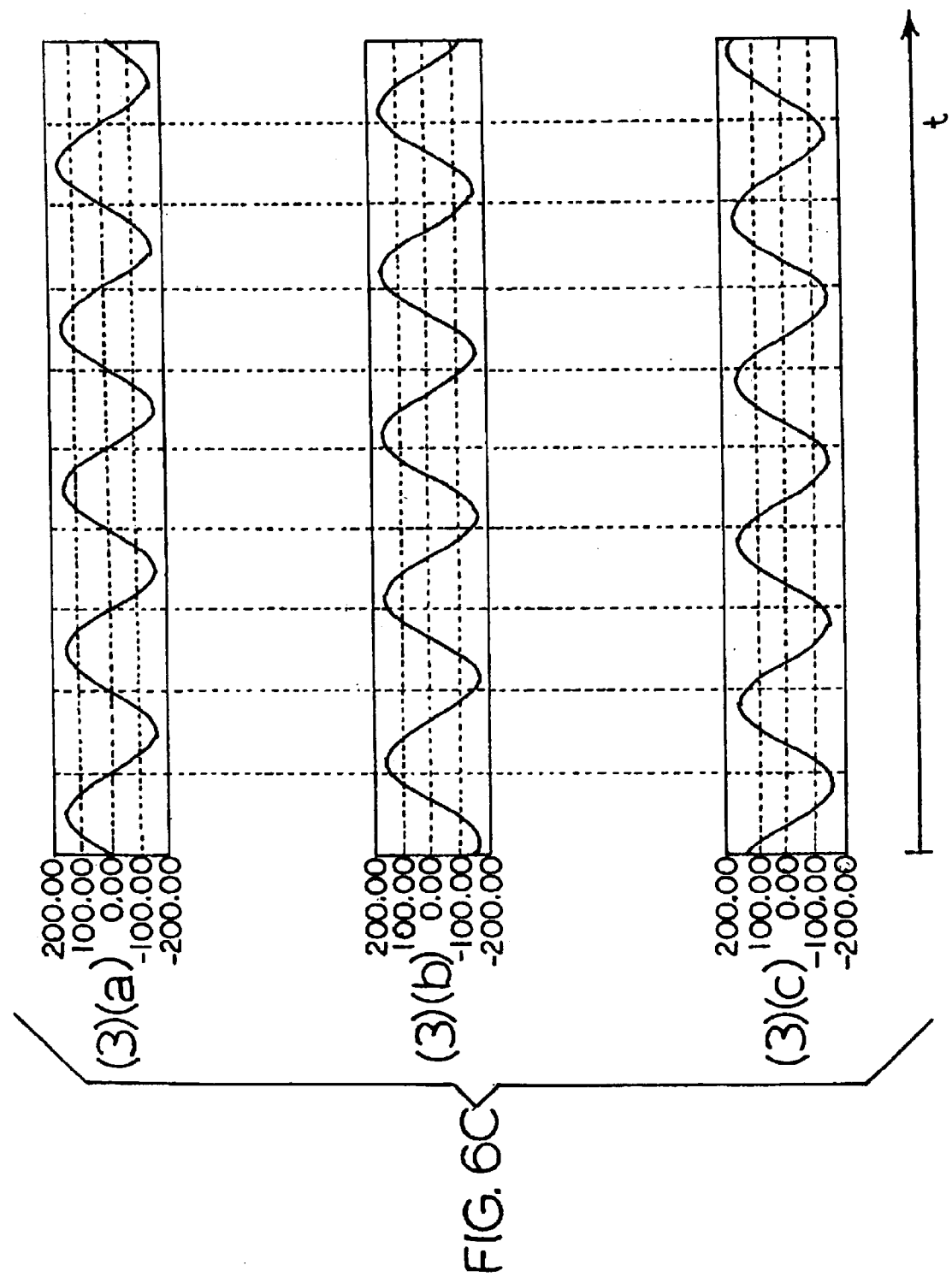

FIG. 5 shows the simulated load with current harmonics and phase shifting. In FIG. 5, waveform (a) illustrates the source voltage (for one phase), waveform (b) illustrates the simulated effects of power conditions on the system, and waveform (c) illustrates the result of compensation. As seen from a comparison of waveforms (b) and (c), the active filter 300 injects a compensating current into the system to suppress the current harmonics. FIGS. 6A–6C illustrate the effect of the active filter 300 on multi-phase power conditions, where waveforms (1)(a), (1)(b), and (1)(c) in FIG. 6A illustrate the effects of power conditions on three-phases of the load current (uncompensated); waveforms (2)(a), (2)(b), and (2)(c) in FIG. 6B illustrates three-phase input currents with active filter compensation; and waveforms (3)(a), (3)(b), and (3)(c) in FIG. 6C illustrates three-phase input voltage. As seen from a comparison of waveforms (2)(a), (2)(b), and (2)(c) with waveforms (1)(a), (1)(b), and (1)(c), the active filter 300 in accordance with the principles of the present invention achieves harmonic, power factor, and phase compensation to improve total power quality in the AC system 10. This compensation is applicable to both constant and variable frequency environments.

We claim:

1. An active filter for generating multi-phase compensating current in an AC power supply system that supplies a load, said filter comprising:

a compensating current output device outputting multi-phase compensating current to an AC power line; and a controller for controlling said compensating current output device without using a transformer such that the multi-phase compensating current compensates for current harmonics and power factor on said AC power line, said controller estimating current harmonics and power factor compensating values as a function of multi-phase power measurement.

2. The active filter according to claim 1, wherein said multi-phase compensating current further compensates for phase imbalance of multi-phase voltage and multi-phase current of said power supply system and said controller estimates phase imbalance compensating values as a function of multi-phase supply voltage and multi-phase supply current measurements.

3. The active filter according to claim 1, wherein said power supply system is a variable frequency system.

4. The active filter according to claim 3, wherein said power system is a variable frequency power system of an aircraft.

5. The active filter according to claim 1, wherein the controller estimates the current harmonics and power factor compensating values as a function of a multi-phase voltage measurement.

6. An active filter for generating multi-phase compensating current in an AC power supply system that supplies a load, said filter comprising:

a compensating current output device outputting multi-phase compensating current to an AC power line; and a controller for controlling said compensating current output such that the multi-phase compensating current compensates for current harmonics and power factor on said AC power line, said controller estimating current harmonics and power factor compensating values as a function of multi-phase power measurement, wherein said controller comprises:

a digital phase lock loop unit that computes voltage reference signals in a quadratic domain.

7. The active filter according to claim 6, wherein said controller further comprises:

a compensating current reference estimator that estimates compensating current reference values based on voltage reference signals computed by said digital phase lock loop unit, said compensating current reference values being in the quadratic domain; and a domain transformer for transforming said compensating current reference values from said quadratic domain to a multi-phase current domain by using a look-up table.

8. The active filter according to claim 7, wherein said compensating current output is an inverter, and said controller further comprises:

an inverter switching control unit that generates inverter switching control signals in accordance with calculated compensating current values.

9. The active filter according to claim 6, wherein said digital phase lock loop unit calculates reference voltage values by:

transforming multi-phase voltage measurement values into a quadratic (d-q) reference frame signals;

filtering the quadratic (d-q) reference frame signals to extract fundamental d-q voltage signals; and processing the fundamental d-q voltage signals to generate said reference voltage values.

10. The active filter according to claim 7, wherein said compensating current reference estimator transforms multi-phase current measurements into transformed current values, said transformed current values having a DC component corresponding to a fundamental current, an AC component corresponding to current harmonics, and a zero sequence current corresponding to multi-phase current balance.

11. The active filter according to claim 7, wherein said compensating current reference values represent a plurality of power conditions, including current harmonics, power factor, and multi-phase current balance.

12. The active filter according to claim 7, wherein said compensating current reference estimator accesses a look up table to generate said compensating current reference values and to achieve desired power quality combinations.

13. A controller of an active filter that generates multi-phase compensating current in an AC power supply system that supplies a load, said controller comprising:

an input for receiving multi-phase power measurements;

a compensating current calculation unit for calculating multi-phase compensating current based on said multi-phase power measurements; and an output for outputting control signals based on the calculated multi-phase compensating current to control a compensating current output device to compensate for current harmonics and power factor on an AC power line without using a transformer.

14. The controller according to claim 13, wherein said multi-phase compensating current further compensates for phase imbalance of multi-phase voltage and multi-phase current of said power supply system and said controller estimates phase imbalance compensating values as a function of multi-phase supply voltage and multi-phase supply current measurements.

15. The controller according to claim 13, wherein said power supply system is a variable frequency system.

16. The controller according to claim 15, wherein said power system is a variable frequency power system of an aircraft.

17. The controller according to claim 13, wherein the compensating current calculation unit calculates the multi-phase compensating current based on a multi-phase voltage measurement.

18. A controller of an active filter that generates multi-phase compensating current in an AC power supply system that supplies a load, said controller comprising:

an input for receiving multi-phase power measurements;

a compensating current calculation unit for calculating multi-phase compensating current based on said multi-phase power measurements; and an output for outputting control signals based on the calculated multi-phase compensating current to control a compensating current output device to compensate for current harmonics and power factor on an AC power line, wherein said compensating current calculation unit comprises:

a digital phase lock loop unit that computes voltage reference signals in a quadratic domain.

19. The controller according to claim 18, wherein said compensating current calculation unit further comprises:

a compensating current reference estimator that estimates compensating current reference values based on voltage reference signals computed by said digital phase lock loop unit, said compensating current reference values being in the quadratic domain; and a domain transformer for transforming said compensating current reference values from said quadratic domain to a multi-phase current domain by using a look-up table.

20. The controller according to claim 19, wherein said compensating current output is an inverter, and said controller generates inverter switching control signals in accordance with calculated compensating current values.

21. The controller according to claim 19, wherein said digital phase lock loop unit calculates reference voltage values by:

transforming multi-phase voltage measurement values into a quadratic (d-q) reference frame signals;

filtering the quadratic (d-q) reference frame signals to extract fundamental d-q voltage signals; and processing the fundamental d-q voltage signals to generate said reference voltage values.

22. The controller according to claim 19, wherein said compensating current reference estimator transforms multi-phase current measurements into transformed current values, said transformed current values having a DC component corresponding to a fundamental current, an AC component corresponding to current harmonics, and a zero sequence current corresponding to multi-phase current balance.

23. The controller according to claim 19, wherein said compensating current reference values represent a plurality of power conditions, including current harmonics, power factor, and multi-phase current balance.

24. The controller according to claim 19, wherein said compensating current reference estimator accesses a look up table to generate said compensating current reference values and to achieve desired power quality combinations.

25. A method of generating multi-phase compensating current in an AC power supply system that supplies a load, said method comprising:

outputting multi-phase compensating current to an AC power line without using a transformer; and adjusting the compensating current output to the AC power line without using a transformer such that the multi-phase compensating current compensates for current harmonics and power factor on the AC power line, said adjusting step estimating current harmonics and power factor compensating values as a function of multi-phase power measurement.

26. The method according to claim 25, wherein said multi-phase compensating current further compensates for phase imbalance of multi-phase voltage and multi-phase current of the power supply system and said step of adjusting estimates phase imbalance compensating values as a function of multi-phase supply voltage and multi-phase supply current measurements.

27. The method according to claim 25, wherein said power supply system is a variable frequency system.

28. The method according to claim 27, wherein said power system is a variable frequency power system of an aircraft.

29. The method according to claim 25, wherein the current harmonics and power factor compensating values are estimated as a function of a multi-phase voltage measurement.

30. The method of generating multi-phase compensating current in an AC power supply system that supplies a load, said method comprising:

outputting multi-phase compensating current to an AC power line; and adjusting the compensating current output to the AC power line such that the multi-phase compensating current compensates for current harmonics and power factor on the AC power line, said adjusting step estimating current harmonics and power factor compensating values as a function of multi-phase power measurement, wherein said step of adjusting comprises:

executing a digital phase lock loop function that computes voltage reference signals in a quadratic domain.

31. The method according to claim 30, wherein said step of adjusting further comprises:

estimating compensating current reference values based on voltage reference signals computed by said digital phase lock loop function, said compensating current reference values being in the quadratic domain; and transforming said compensating current reference values from said quadratic domain to a multi-phase current domain by using a look-up table.

32. The method according to claim 30 wherein said digital phase lock loop function calculates reference voltage values by:

transforming multi-phase voltage measurement values into a quadratic (d-q) reference frame signals;

filtering the quadratic (d-q) reference frame signals to extract fundamental d-q voltage signals; and processing the fundamental d-q voltage signals to generate said reference voltage values.

33. The method according to claim 31, wherein said compensating current reference values represent a plurality of power conditions, including current harmonics, power factor, and multi-phase current balance.

34. The method according to claim 31, wherein said step of estimating compensating current reference values accesses a look up table to generate said compensating current reference values and to achieve desired power quality combinations.

* * * * *

UNITED STATES PATENT AND TRADEMARK OFFICE
CERTIFICATE OF CORRECTION

PATENT NO.    : 6,861,897 B1
DATED         : March 1, 2005
INVENTOR(S)   : Cheng et al.

It is certified that error appears in the above-identified patent and that said Letters Patent is hereby corrected as shown below:

Column 3,
Line 56, delete "DPPL" and insert therefor -- DPLL --.

Column 5,
Line 22, delete "DPPL" and insert therefor -- DPLL --.
Line 38, delete "IO" and insert therefor -- I0 --.

Signed and Sealed this

Thirteenth Day of September, 2005

JON W. DUDAS
*Director of the United States Patent and Trademark Office*